(No Model.)
M. H. SIMMONS.
WHIFFLETREE HOOK.
No. 313,780. Patented Mar. 10, 1885.
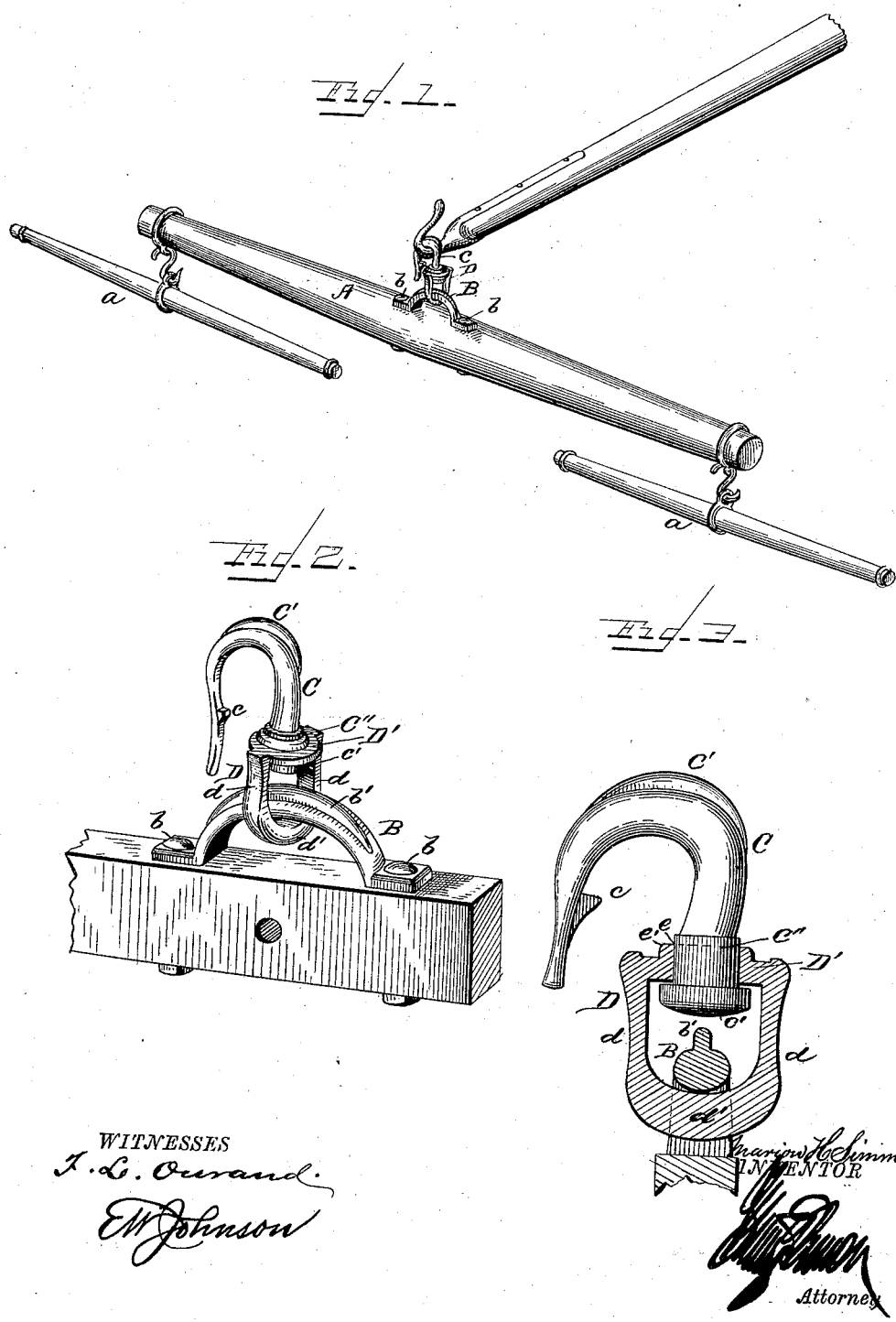

UNITED STATES PATENT OFFICE.

MARION HOMER SIMMONS, OF KANSAS CITY, MISSOURI, ASSIGNOR OF ONE-HALF TO MARTIN T. SIMMONS, OF SAME PLACE.

WHIFFLETREE-HOOK.

SPECIFICATION forming part of Letters Patent No. 313,780, dated March 10, 1885.

Application filed November 26, 1884. (No model.)

*To all whom it may concern:*

Be it known that I, MARION H. SIMMONS, a citizen of the United States of America, residing at Kansas City, in the county of Jackson and State of Missouri, have invented certain new and useful Improvements in Whiffletree-Hooks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in whiffletree-hooks, the same being designed to be attached to the central portion of the double-tree; and my invention consists in the construction and combination of the parts, as will be hereinafter fully set forth, and specifically pointed out in the claims.

In the accompanying drawings, which illustrate my invention, Figure 1 is a perspective view showing the same attached to a double-tree. Fig. 2 is an enlarged perspective view, and Fig. 3 is a sectional view.

A represents a double-tree, and $a$ $a$ the single-trees, which are connected to the ends of the double-tree in the usual manner. The central portion of the double-tree has attached thereto, by means of bolts $b$ $b$, an arched bar, B, the ends of which are bent and provided with perforations, through which the bolts $b$ $b$ pass. This arched bar B is provided above its curved portion with a strengthening-rib, $b'$, the largest portion of this rib being at the center of the arch, while it tapers downwardly, as shown in Fig. 2. The central inner portion of the arched bar B is substantially semi-circular in cross-section, and its sides are rounded. The hook C is provided at one terminal portion with an angular stop, $c$. The central portion of this hook, which is curved, has formed integral with its main portion a rib, $C'$, while its end which engages with the swivel D is headed, as shown at $c'$, and provided with a cylindrical portion, $C''$. The swivel D consists of side pieces, $d$ $d$, which are connected to each other by a curved portion, $d'$, of increased thickness, and a cross-plate, $D'$, which is provided with a circular rim and central perforation, $e$, adjacent to which, on the upper side of the plate $D'$, is a raised portion, $e'$, so as to provide a large bearing-surface for the cylindrical portion of the hook. The under side of the cross-piece $D'$ of the swivel D is perfectly flat, and forms a bearing for the enlarged head $c'$ of the hook.

The invention hereinbefore described is specially adapted to be attached to the clevis of an agricultural implement, or hook upon the end of the pole of a wagon when more than a single team is employed, and the stop $c$ upon the hook will prevent the hook from becoming accidently displaced, and the swivel-connection will allow the whiffletree to turn without a corresponding movement of the clevis or hook to which it is attached.

It will be noticed that the whiffletree-hook hereinbefore described is composed of but three parts, and that when they are placed together, as shown in the drawings, they cannot become detached or separated from each other. To place the parts together, the hook is first passed through the perforation in the swivel, and the arched bar B is then passed through the central opening in said swivel. By this construction all riveting-nuts and similar devices are dispensed with.

I claim—

1. The combination, in a whiffletree-hook, of an arched bar perforated for attachment to the tree, a yoke, D, having at its upper end a central perforation, a hook, C, adapted to be passed through the perforation of said yoke and to be removed therefrom, as specified, and provided with a cylindrical portion to bear in said perforation, and an enlarged head to prevent its withdrawal therefrom, the said arched bar being designed to pass through said yoke, and thereby prevent the reverse removal of said hook, substantially as set forth.

2. The combination, in a whiffletree-hook, of an arched bar having a graduated rib, $b'$, and perforated for attachment to the tree, a yoke, D, having at its upper end a central perforation, a hook, C, adapted to be passed through the perforation of said yoke and to be removed therefrom, as specified, and having an angular stop, c, rib C', and a cylindrical portion, C'', to bear in said yoke-perforation, and headed to prevent withdrawal from said yoke, the said arched bar being designed to pass through the said yoke, and thereby prevent the reverse removal of said hook, substantially as set forth.

In testimony whereof I affix my signature in presence of two witnesses.

MARION HOMER SIMMONS.

Witnesses:
M. T. SIMMONS,
H. G. HENLEY.